(12) United States Patent
Munshi

(10) Patent No.: US 6,784,892 B1
(45) Date of Patent: Aug. 31, 2004

(54) FULLY ASSOCIATIVE TEXTURE CACHE HAVING CONTENT ADDRESSABLE MEMORY AND METHOD FOR USE THEREOF

(75) Inventor: Aaftab Munshi, Los Gatos, CA (US)

(73) Assignee: Micron Technology, Inc., Boise, ID (US)

( * ) Notice: Subject to any disclaimer, the term of this patent is extended or adjusted under 35 U.S.C. 154(b) by 410 days.

(21) Appl. No.: 09/684,168

(22) Filed: Oct. 5, 2000

(51) Int. Cl.[7] ................................................ G09G 5/36
(52) U.S. Cl. .................. 345/557; 345/552; 345/558; 345/531
(58) Field of Search ................................ 345/501–506, 345/519–520, 522, 530–574; 711/118, 133, 136, 137, 140

(56) References Cited

U.S. PATENT DOCUMENTS

| | | | |
|---|---|---|---|
| 4,785,398 A | 11/1988 | Joyce et al. | 364/200 |
| 5,574,875 A | 11/1996 | Stansfield et al. | 395/403 |
| 5,668,972 A | 9/1997 | Liu et al. | 711/136 |
| 5,798,767 A | 8/1998 | Poole et al. | 345/431 |
| 5,805,855 A | 9/1998 | Liu | 395/435 |
| 5,850,208 A | 12/1998 | Poole et al. | 345/153 |
| 5,987,567 A | 11/1999 | Rivard et al. | 711/118 |
| 6,157,987 A * | 12/2000 | Krishnamurthy et al. | 345/557 |
| 6,215,497 B1 * | 4/2001 | Leung | 345/419 |
| 6,353,874 B1 * | 3/2002 | Morein | 711/118 |
| 6,426,753 B1 * | 7/2002 | Migdal | 345/506 |
| 6,560,674 B1 * | 5/2003 | Hosogi et al. | 711/118 |
| 6,587,113 B1 | 7/2003 | Baldwin et al. | 345/557 |
| 6,734,867 B1 * | 5/2004 | Munshi et al. | 345/557 |

* cited by examiner

Primary Examiner—Kee M. Tung
(74) Attorney, Agent, or Firm—Dorsey & Whitney LLP

(57) ABSTRACT

A graphics processing system including a cache memory circuit coupled to the graphics processor and the address and data busses for storing graphics data according to a respective address. The cache memory includes first and second memories coupled together by a plurality of activation lines. The first memory has a corresponding plurality of address detection units to store addresses and provide activation signals in response to receiving a matching address. The second memory includes a corresponding plurality of data storage locations. Each data storage location is coupled to a respective one of the plurality of address storage locations by a respective activation line to provide graphics data in response to receiving an activation signal from the respective address storage location.

26 Claims, 3 Drawing Sheets

US 6,784,892 B1

FULLY ASSOCIATIVE TEXTURE CACHE HAVING CONTENT ADDRESSABLE MEMORY AND METHOD FOR USE THEREOF

TECHNICAL FIELD

The present invention is related generally to the field of computer graphics, and more particularly, to caching graphics information in a computer graphics processing system.

BACKGROUND OF THE INVENTION

A graphics accelerator is a specialized graphics processing subsystem for a computer system that relieves a host processor from performing all the graphics processing involved in rendering a graphics image on a display device. The host processor of the computer system executes an application program that generates geometry information used to define graphics elements on the display device. The graphics elements that are displayed are typically modeled from polygon graphics primitives. For example, a triangle is a commonly used polygon for rendering three dimensional objects on the display device. Setup calculations are initially performed by the host processor to define the triangle primitives. The application program then transfers the geometry information from the processor to the graphics processing system so that the triangles may be modified by adding shading, hazing, or other features before being displayed. The graphics processing system, as opposed to the processor, has the task of rendering the corresponding graphics elements on the display device to allow the processor to handle other system requests.

Some polygon graphics primitives also include specifications to map texture data, representative of graphic images, within the polygons. Texture mapping refers to techniques for adding surface detail, or a texture map, to areas or surfaces of the polygons displayed on the display device. A typical texture map includes point elements ("texels") which reside in a (s, t) texture coordinate space. The graphics data representing the texels of a texture map are stored in a memory of the computer system and used to generate the color values of point elements ("pixels") of the display device which reside in an (x, y) display coordinate space. Where the original graphics primitives are three dimensional, texture mapping often involves maintaining certain perspective attributes with respect to the surface detail added to the graphics primitive, a texture image is represented in the computer memory as a bitmap or other raster-based encoded format.

Generally, the process of texture mapping occurs by accessing the texels from the memory that stores the texture data, and transferring the texture map texels to predetermined points of the graphics primitive being texture mapped. The (s, t) coordinates for the individual texels are calculated and then converted to memory addresses. The texture map data are read out of memory and applied within the respective polygon in particular fashions depending on the placement and perspective of their associated polygon. The process of texture mapping operates by applying color or visual attributes of texels of the (s, t) texture map to corresponding pixels of the graphics primitive on the display. Thus, color values for pixels in (x, y) display coordinate space are determined based on sampled texture map values. After texture mapping, a version of the texture image is visible on surfaces of the graphics primitive, with the proper perspective, if any.

The process of texture mapping requires a great demand on the memory capacity of the computer graphics processing system because a lot of texture maps are accessed from memory during a typical display screen update cycle. Since the frequency of the screen update cycles is rapid, the individual polygons of the screen (and related texture map data per polygon) need to be accessed and updated at an extremely rapid frequency requiring great data throughput capacities. In view of the above memory demands, high performance graphics hardware units often integrate a graphics processor and a low access time cache memory unit onto a common substrate for storing and retrieving blocks of texture data at high speeds.

A tag cache, typically implemented by using a random access memory (RAM), stores a "tag" for each data block stored in a data cache. The tag is usually the memory address, or a portion thereof, corresponding the location in the host memory where the data is stored. In a fully associative cache, that is, a cache where data may be stored in any of the data storage locations of the data cache, the address of the requested data must be compared with each of the tags stored in the tag cache. With texture caches, as a texture-mapped polygon is processed a cache controller must check each address present in the tag cache to determine whether a requested block of texture data is stored in the texture cache. If the requested texture data is present in the data cache, it is immediately provided for texture application to the polygon. However, if the requested memory address is not present in the texture cache, the cache controller unit must first obtain the desired block of texture data from memory. The data and tag caches are updated with the retrieved data and corresponding memory address, respectively, prior to being provided for texture application.

Although cache memory units improve the speed at which data may be provided for processing, implementing a cache memory unit with a tag RAM often requires complex circuitry to examine all of the addresses of the texture data present in the texture cache. This is especially the case for a fully associative cache. The complexity of the circuitry results in increased access times and may require a substantial portion of the substrate for their layout. Therefore, it can be appreciated that there is a need for a texture cache having reduced complexity and that can provide texture mapped data at high speeds.

SUMMARY OF THE INVENTION

The present invention is directed toward a graphics processing system having a bus interface for coupling to a system bus, a graphics processor coupled to the bus interface to process graphics data, and address and data busses coupled to the graphics processor to transfer address and graphics data to and from the graphics processor. Further included in the graphics processing system is a cache memory circuit coupled to the graphics processor and the address and data busses for storing graphics data according to a respective address. The cache memory includes first and second memories coupled together by a plurality of activation lines. The first memory has a corresponding plurality of address detection units to store addresses and provide activation signals in response to receiving a matching address. The second memory includes a corresponding plurality of data storage locations. Each data storage location is coupled to a respective one of the plurality of address storage locations by a respective activation line to provide graphics data in response to receiving an activation signal from the respective address storage location.

DETAILED DESCRIPTION OF THE INVENTION

Figure 1:
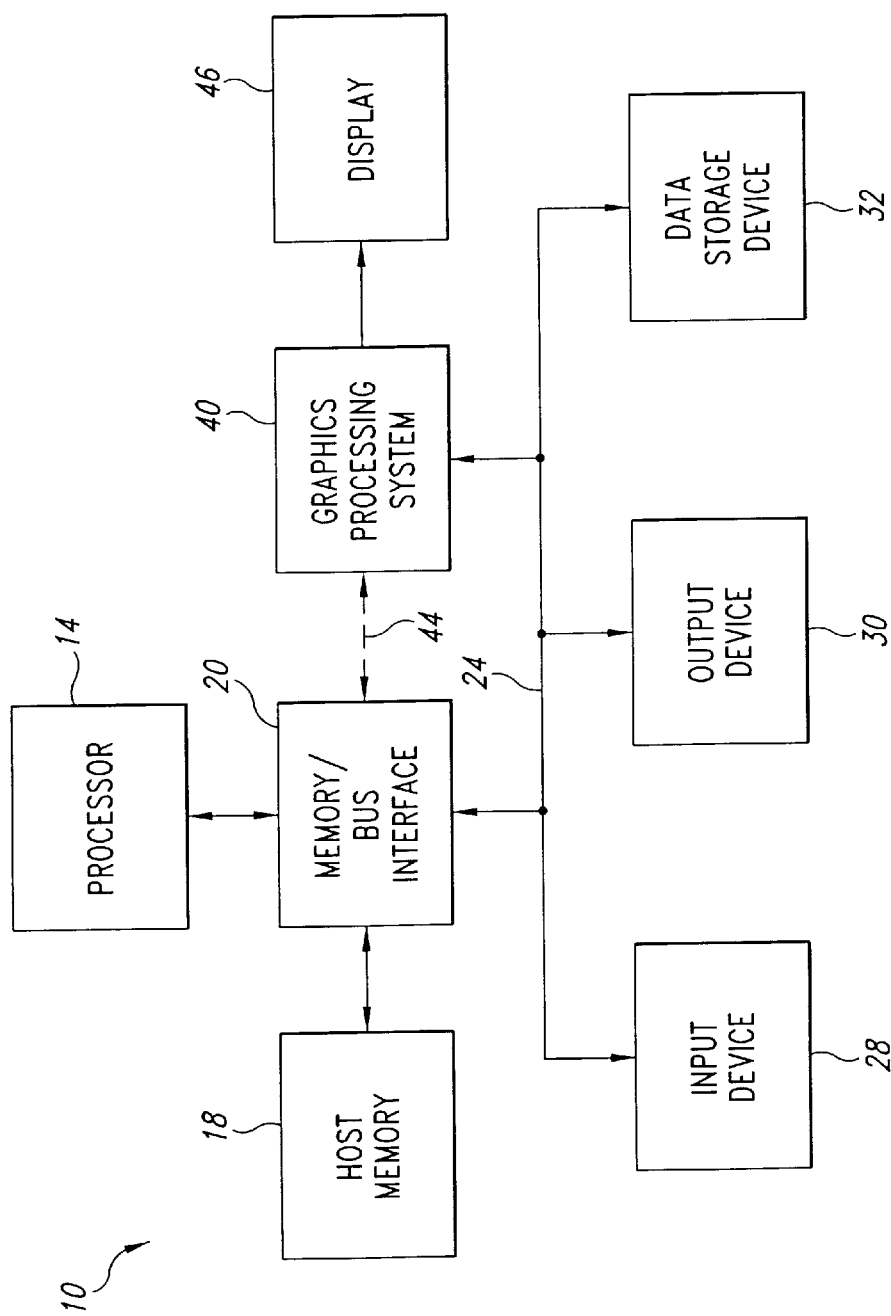
FIG. 1 is a block diagram of a computer system in which an embodiment of the present invention is implemented.

Embodiments of the present invention provide a fully associative cache configuration for a texture cache in a graphics processing system. FIG. 1 illustrates a computer system 10 in which embodiments of the present invention are implemented. The computer system 10 includes a processor 14 coupled to a host memory 18 by a memory/bus interface 20. The memory/bus interface 20 is also coupled to an expansion bus 24, such as an industry standard architecture (ISA) bus or a peripheral component interconnect (PCI) bus. The computer system 10 also includes one or more input devices 28, such as a keypad or a mouse, coupled to the processor 14 through the expansion bus 24 and the memory/bus interface 20. The input devices 28 allow an operator or an electronic device to input data to the computer system 10. One or more output devices 30 are coupled to the processor 14 to provide output data generated by the processor 14. The output devices 30 are coupled to the processor 14 through the expansion bus 24 and memory/bus interface 20. Examples of output devices 30 include printers and a sound card driving audio speakers. One or more data storage devices 32 are coupled to the processor 14 through the memory/bus bridge interface 20, and the expansion bus 24 to store data in or retrieve data from storage media (not shown). Examples of storage devices 32 and storage media include fixed disk drives, floppy disk drives, tape cassettes and compact-disk read-only memory drives.

The computer system 10 further includes a graphics processing system 40 coupled to the processor 14 through the expansion bus 24 and memory/bus interface 20. Embodiments of the present invention are implemented within the graphics processing system 40. Optionally, the graphics processing system 40 may be coupled to the processor 14 and the host memory 18 through other architectures. For example, the graphics processing system 40 may be coupled through the memory/bus interface 20 and a high speed bus 44, such as an accelerated graphics port (AGP), to provide the graphics processing system 40 with direct memory access (DMA) to the host memory 18. That is, the high speed bus 44 and memory bus interface 20 allow the graphics processing system 40 to read and write host memory 18 without the intervention of the processor 14. Thus, data may be transferred to, and from, the host memory 18 at transfer rates much greater than over the expansion bus 24. A display 46 is coupled to the graphics processing system 40 to display graphics images, and may be any type, such as a cathode ray tube (CRT) for desktop, workstation or server application, or a field emission display (FED), liquid crystal display (LCD), or the like, which are commonly used for portable computer.

Figure 2:
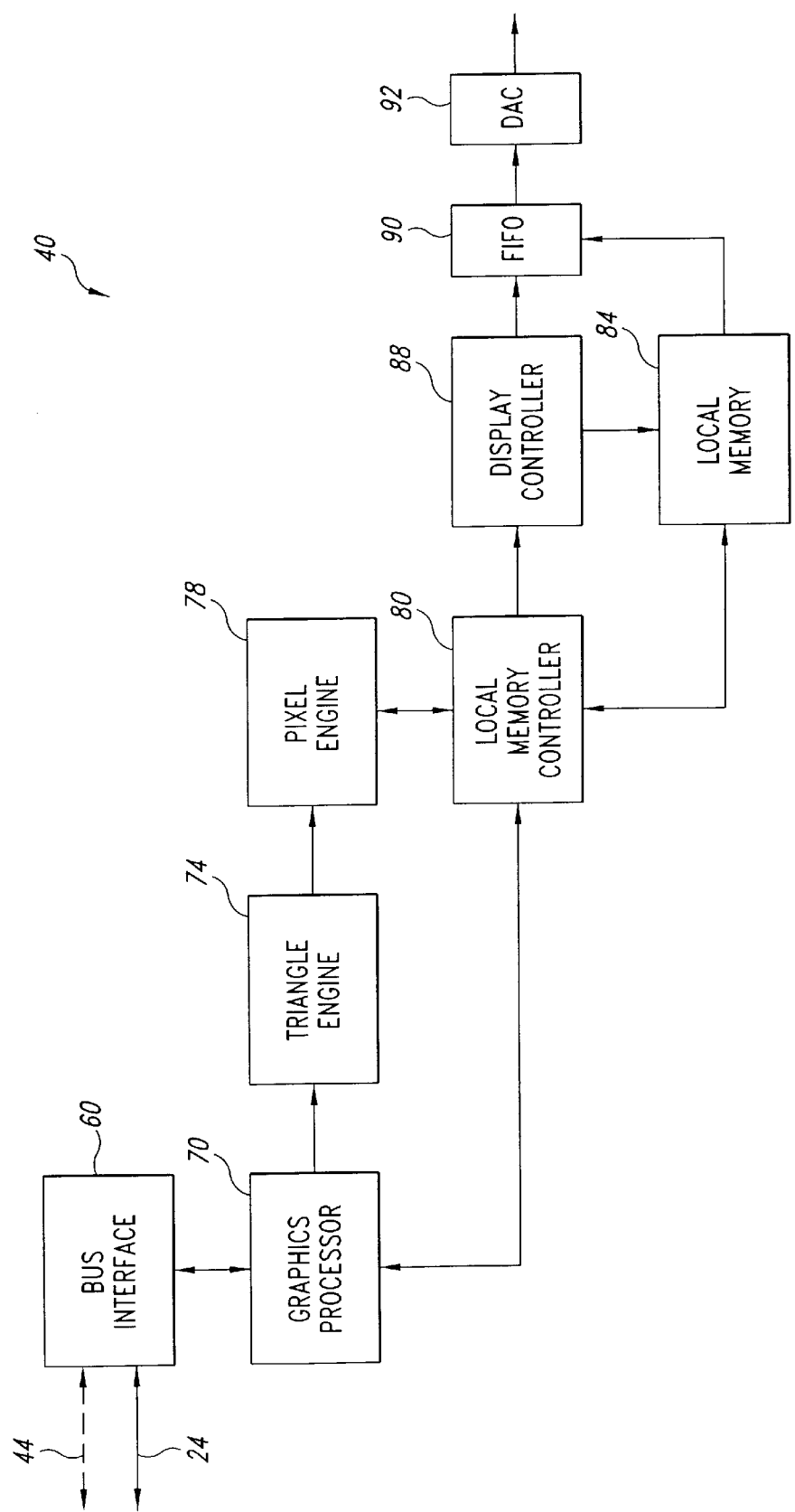
FIG. 2 is a block diagram of a graphics processing system in the computer system of FIG. 1.

FIG. 2 illustrates circuitry included within the graphics processing system 40, including circuitry for performing various three-dimensional (3D) graphics function. As shown in FIG. 4, a bus interface 60 couples the graphics processing system 40 to the expansion bus 24. Where the graphics processing system 40 is coupled to the processor 14 and the host memory 18 through the high speed data bus 44 and the memory/bus interface 20, the bus interface 60 will include a DMA controller (not shown) to coordinate transfer of data to and from the host memory 18 and the processor 14. A graphics processor 70 is coupled to the bus interface 60 and is designed to perform various graphics and video processing functions, such as, but not limited to, vertex transformations. In the preferred embodiment, the graphics processor 70 is a reduced instruction set computing (RISC) processor. Data generated by the graphics processor 70 is provided to a triangle engine 74. The triangle engine 74 contains circuitry for performing various graphics functions, such as clipping, attribute transformations, rendering of graphics primitives, and generating texture coordinates (s, t) from a texture map.

A pixel engine 78 is coupled to receive the graphics data generated by the triangle engine 74. The pixel engine 78 contains circuitry for performing various graphics functions, such as, but not limited to, texture application, bilinear filtering, fog, blending, color space conversion, and dithering. A memory controller 80 coupled to the pixel engine 78 and the graphics processor 70 handles memory requests to and from the host memory 18, and a local memory 84. The local memory 84 stores graphics data, such as texture data, in the compressed format provided by the data compression circuit 76 and the graphics processor 70, and additionally stores both source pixel color values and destination pixel color values. Destination color values are stored in a frame buffer (not shown) within the local memory 84. In a preferred embodiment, the local memory 84 is implemented using random access memory (RAM), such as dynamic random access memory (DRAM), or static random access memory (SRAM). A display controller 88 coupled to the local memory 84 and to a first-in first-out (FIFO) buffer 90 controls the transfer of destination color values stored in the frame buffer to the FIFO 90. Destination values stored in the FIFO 90 are provided to a digital-to-analog converter (DAC) 92, which outputs red, green, and blue analog color signals to the display 46 (FIG. 1).

Figure 3:
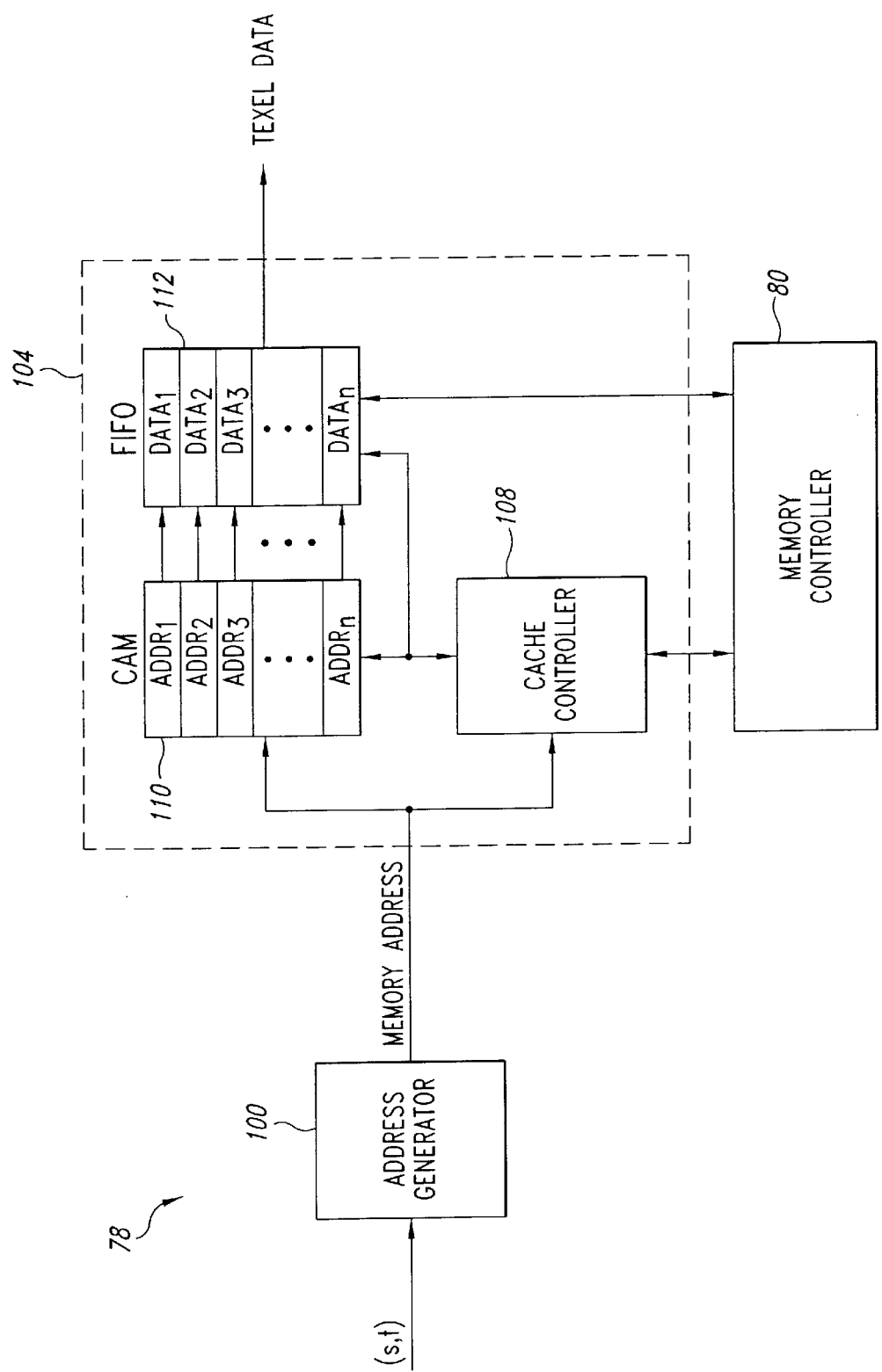
FIG. 3 is a block diagram of circuitry from a pixel engine in the graphics processing system of FIG. 2.

FIG. 3 illustrates circuitry included within the pixel engine 78, including circuitry for providing texture map data used in texture application functions. An address generator 100 receives the texture map coordinates (s, t) from the triangle engine and converts them to texel addresses corresponding to where the data representing the respective texels are stored in memory. A texture cache 104 coupled to the address generator 100 receives the texel addresses and determines whether the referenced texel address is present in the texture cache 104. The texture cache 104 includes a cache controller 108 receiving the texel address from the address generator 100, and a content addressable memory (CAM) 110 coupled to a FIFO buffer 112 through a number of activation lines. The CAM 110 and FIFO buffer 112 may be of a conventional design well known to those of ordinary skill in the art. Each address storage location of the CAM 110 is coupled through a respective activation line to a corresponding data storage location in the FIFO 112. The cache controller 108 and the FIFO 112 are also coupled to the memory controller 80 to request data to be transferred between the FIFO 112 and either the local memory 84 or the host memory 18.

As mentioned previously, each texel address generated by the address generator 100 is checked to determine whether the texel address of the requested block of texture data is present in the CAM 110. If present, then there is a cache "hit." The activation line corresponding to the entry in the CAM 110 matching the texel address becomes active, causing the corresponding data block of the FIFO 112 to output its texture data. The texture data is provided to the next graphics processing stage in the pixel engine pipeline. As mentioned previously, the pixel engine performs additional graphics functions on the data provided by the texture cache. A more detailed description of these specific graphics functions has been omitted in the interests of brevity, and may be found in U.S. Pat. Nos. 5,798,767 and 5,850,208 to Poole et al., issued Aug. 25, 1998 and Dec. 15, 1998, respectively, which are incorporated herein by reference.

In the case where the texel address provided by the address generator 100 is not present in the CAM 110, there is a cache "miss," and the texture data associated with the texel address must be fetched from either the local memory 84 or the host memory 18. A data request is made by the cache controller 108 to the memory controller 80 to obtain the texture data, and a data block in the FIFO 112 is cleared for the receipt of the new texture data according to the first-in-first-out rule. If the requested texture data is not present in the local memory 84, then a request is made to retrieve the texture data from the host memory 18. Obtaining the texture data from memory is handled by the memory controller 80 and the graphics processor 70. When the texture data is returned by the memory controller 80, the cache controller 110 causes the new texture data to be written into the recently cleared data block in the FIFO 112, and the corresponding texel address to be entered into the CAM 110. The texture data is then provided to the next processing stage in the pixel engine pipeline.

The cache configuration illustrated in FIG. 3 provides a fully associative cache for texture data. That is, the texture data may be stored in any of the data storage locations of the FIFO 112. Consequently, the addresses provided to the texture cache 104 must be checked against each of the addresses of the texture data present in the CAM 110. Checking the texel addresses provided by the address generator 100 against each address of the texture data present in the FIFO 112 is facilitated by the CAM 110.

It will be appreciated that the cache configuration illustrated in FIG. 3 may be implemented for a variety of cache sizes. The cache size of the texture cache 104 will depend several considerations that are understood by those of ordinary skill in the art.

From the foregoing it will be appreciated that, although specific embodiments of the invention have been described herein for purposes of illustration, various modifications may be made without deviating from the spirit and scope of the invention. For example, the texture cache 104 has been described as including the FIFO 112 to store the texture data, however, a buffer implementing a LRU replacement algorithm could be substituted for the FIFO 112. Accordingly, the invention is not limited except as by the appended claims.

What is claimed is:

1. A graphics processing system, comprising:
 a bus interface for coupling to a system bus;
 a graphics processor coupled to the bus interface to process graphics data;
 address and data busses coupled to the graphics processor to transfer address and graphics data to and from the graphics processor; and
 a cache memory circuit coupled to the graphics processor and the address and data busses for storing graphics data, the cache memory comprising:
 a tag memory having a plurality of activation lines to store a corresponding plurality of addresses for the graphics data and to provide an activation signal on one of the activation lines in response to receiving an address matching one of the plurality of addresses; and
 a data cache coupled to the plurality of activation lines of the tag memory, the data cache having a corresponding plurality of data storage locations to store the graphics data and to provide graphics data stored in one of the data storage locations in response to receiving a corresponding activation signal.

2. The graphics processing system of claim 1 wherein the graphics data comprises texture graphics data.

3. The graphics processing system of claim 1 wherein the tag memory comprises a content addressable memory.

4. The graphics processing system of claim 1 wherein the data cache comprises a FIFO buffer.

5. The graphics processing system of claim 1, further comprising an address generator circuit coupled to the cache memory circuit and graphics processor to calculate addresses for the graphics data and provide the calculated addresses to the tag memory.

6. The graphics processing system of claim 1 wherein the cache memory circuit further includes a cache controller circuit coupled to the tag memory and the data cache to retrieve graphics data corresponding to an address provided to the tag memory not matching any of the plurality of stored addresses.

7. A graphics processing system, comprising:
 a bus interface for coupling to a system bus;
 a graphics processor coupled to the bus interface to process graphics data;
 address and data busses coupled to the graphics processor to transfer address and graphics data to and from the graphics processor; and
 a cache memory circuit coupled to the graphics processor and the address and data busses for storing graphics data according to a respective address, the cache memory comprising first and second memories coupled together by a plurality of activation lines, the first memory having a corresponding plurality of address detection units to store addresses and provide activation signals in response to receiving a matching address, and the second memory having a corresponding plurality of data storage locations, each data storage location coupled to a respective one of the plurality of address storage locations by a respective activation line to provide graphics data in response to receiving an activation signal from the respective address storage location.

8. The graphics processing system of claim 7 wherein the first memory comprises a content addressable memory.

9. The graphics processing system of claim 7 wherein the second memory comprises a FIFO buffer.

10. The graphics processing system of claim 7, further comprising an address generator circuit coupled to the cache memory circuit and graphics processor to calculate addresses for the graphics data and provide the calculated addresses to the first memory.

11. The graphics processing system of claim 7 wherein the cache memory further includes a cache controller circuit coupled to the first and second memories to retrieve graphics data corresponding to an address provided to the first memory not matching any of the plurality of stored addresses.

12. The graphics processing system of claim 7 wherein the graphics data comprises texture graphics data.

13. A graphics processing system, comprising:
 a bus interface for coupling to a system bus;
 a graphics processor coupled to the bus interface to process graphics data;
 address and data busses coupled to the graphics processor to transfer address and graphics data to and from the graphics processor; and a cache memory circuit coupled to the graphics processor and the address and data busses for storing graphics data according to a respective address, the cache memory comprising:

a comparing means to compare memory addresses to a plurality of tag addresses stored in a corresponding plurality of memory locations; and an activating means to activate a storage location coupled to the memory location storing the matching memory address to provide requested graphics data.

14. The graphics processing system of claim 13, further comprising a converting means to convert a relative address for a texel to a memory address at which requested graphics data for the texel is stored.

15. The graphics processing system of claim 13 wherein the comparing means and activating means comprises a content addressable memory circuit.

16. The graphics processing system of claim 13 wherein the storage location is one of a plurality of storage locations included in a FIFO memory circuit.

17. A computer system, comprising:

a system processor;

a system bus coupled to the system processor;

a system memory coupled to the system bus; and a graphics processing system coupled to the system bus, the graphics processing system, comprising:

a bus interface for coupling to the system bus;

a graphics processor coupled to the bus interface to process graphics data;

address and data busses coupled to the graphics processor to transfer address and graphics data to and from the graphics processor; and a cache memory circuit coupled to the graphics processor and the address and data busses for storing graphics data according to a respective address, the cache memory comprising first and second memories coupled together by a plurality of activation lines, the first memory having a corresponding plurality of address detection units to store addresses and provide activation signals in response to receiving a matching address, and the second memory having a corresponding plurality of data storage locations, each data storage location coupled to a respective one of the plurality of address storage locations by a respective activation line to provide graphics data in response to receiving an activation signal from the respective address storage location.

18. The computer system of claim 17 wherein the first memory comprises a content addressable memory.

19. The computer system of claim 17 wherein the second memory comprises a FIFO buffer.

20. The computer system of claim 17, further comprising an address generator circuit coupled to the cache memory circuit and graphics processor to calculate addresses for the graphics data and provide the calculated addresses to the first memory.

21. The computer system of claim 17 wherein the cache memory further includes a cache controller circuit coupled to the first and second memories to retrieve graphics data corresponding to an address provided to the first memory not matching any of the plurality of stored addresses.

22. The computer system of claim 17 wherein the graphics data comprises texture graphics data.

23. A method of retrieving graphics data in a graphics processing system, comprising:

converting a relative address for a texel to a memory address at which requested graphics data for the texel is stored;

comparing the memory address to a plurality of tag addresses stored in a corresponding plurality of memory locations of a content addressable memory; and activating a storage location coupled to the memory location storing the matching memory address to provide the requested graphics data.

24. The method of claim 23 wherein the storage location is one of a plurality of storage locations in a FIFO memory.

25. The method of claim 23, further comprising retrieving the requested graphics data from an external memory circuit if a matching memory address is not found.

26. The method of claim 25 wherein the storage location is one of a plurality of storage locations in a FIFO memory circuit, the method further comprising:

replacing graphics data least recently stored in the FIFO memory circuit with the retrieved requested graphics data; and storing the memory address in place of the stored tag address corresponding with the graphics data least recently stored in the FIFO memory circuit.

* * * * *